United States Patent
Hashimoto et al.

(10) Patent No.: US 11,187,175 B2
(45) Date of Patent: Nov. 30, 2021

(54) CONTROLLER AND CONTROL METHOD FOR INTERNAL COMBUSTION ENGINE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/140,208

(22) Filed: Jan. 4, 2021

(65) Prior Publication Data
US 2021/0222640 A1    Jul. 22, 2021

(30) Foreign Application Priority Data
Jan. 22, 2020  (JP) .............................. JP2020-008233

(51) Int. Cl.
*F02D 41/10*   (2006.01)
*F02D 41/24*   (2006.01)

(52) U.S. Cl.
CPC ......... *F02D 41/10* (2013.01); *F02D 41/2438* (2013.01); *F02D 2200/60* (2013.01)

(58) Field of Classification Search
CPC ... F02D 41/10; F02D 41/2438; F02D 2200/60
See application file for complete search history.

(56) References Cited

U.S. PATENT DOCUMENTS

| 6,032,139 A | 2/2000 | Yamaguchi et al. |
| 6,064,996 A | 5/2000 | Yamaguchi et al. |

(Continued)

FOREIGN PATENT DOCUMENTS

| EP | 0374960 A2 * | 6/1990 | ............... B60L 3/10 |
| JP | 2016-006327 A | 1/2016 | |
| WO | WO-2011104852 A1 * | 9/2011 | .......... B60W 30/188 |

OTHER PUBLICATIONS

Lin Xue et al., "Reinforcement Learning Based Power Management for Hybrid Electric Vehicles", 2014 IEEE/ACM International Conference on Computer-Aided Design (ICCAD), IEEE, Nov. 2, 2014, pp. 32-38 (Year: 2014).

(Continued)

*Primary Examiner* — Joseph J Dallo
(74) *Attorney, Agent, or Firm* — Oblon, McClelland, Maier & Neustadt, L.L.P.

(57) ABSTRACT

A controller includes a memory device and an execution device, which executes an operation of an operated unit of an internal combustion engine. The execution device includes a first operation process that operates the operated unit by an operated amount, which is calculated on the basis of a state of a vehicle, using an adapted data set, a second operation process that operates the operated unit by an operated amount that is defined by a relationship defining data set and the state of the vehicle, and a switching process that switches the operation of the operated unit between an operation by the first operation process and an operation by the second operation process, depending on whether the vehicle is performing a manual acceleration travel or an automatic acceleration travel.

6 Claims, 6 Drawing Sheets

(56) References Cited

U.S. PATENT DOCUMENTS

| | | | |
|---|---|---|---|
| 6,425,374 B1 | 7/2002 | Schmitz et al. | |
| 6,549,815 B1 | 4/2003 | Kaji | |
| 2002/0020396 A1* | 2/2002 | Sakamoto | F02D 41/38 123/492 |
| 2004/0078095 A1 | 4/2004 | Mizutani | |
| 2004/0128057 A1* | 7/2004 | Kitazawa | G05B 11/42 701/110 |
| 2011/0077841 A1* | 3/2011 | Minami | F02D 41/2467 701/104 |
| 2011/0288715 A1* | 11/2011 | Schaffeld | F02D 41/0007 701/31.4 |
| 2011/0288730 A1* | 11/2011 | Schaffeld | F02D 41/0007 701/54 |
| 2012/0117011 A1 | 5/2012 | Hashimoto et al. | |
| 2012/0216532 A1* | 8/2012 | Schaffeld | F02D 41/10 60/611 |
| 2012/0216533 A1* | 8/2012 | Schaffeld | F02B 37/12 60/611 |
| 2012/0221223 A1* | 8/2012 | Schaffeld | F02B 33/38 701/102 |
| 2017/0234251 A1 | 8/2017 | Commenda et al. | |
| 2018/0293814 A1 | 10/2018 | Gilbert et al. | |
| 2019/0242319 A1 | 8/2019 | Matsumoto et al. | |
| 2019/0329772 A1 | 10/2019 | Graves et al. | |
| 2020/0063676 A1 | 2/2020 | Neema et al. | |
| 2020/0063681 A1 | 2/2020 | Neema et al. | |
| 2020/0164745 A1 | 5/2020 | Mohan et al. | |
| 2020/0398859 A1 | 12/2020 | Borhan et al. | |
| 2021/0115834 A1 | 4/2021 | Hashimoto et al. | |
| 2021/0115866 A1 | 4/2021 | Hashimoto et al. | |
| 2021/0189990 A1 | 6/2021 | Hashimoto et al. | |
| 2021/0231070 A1 | 7/2021 | Hashimoto et al. | |
| 2021/0239060 A1 | 8/2021 | Hashimoto et al. | |

OTHER PUBLICATIONS

Hu Yue et al. Sciences, vol Energy Management Strategy for a Hybrid Electric Vehicle Based on Deep Reinforcement Learning', Applied Science vol. 8, No. 2, Jan. 26, 2018, pp. 1-15 (Year: 2018).

Hu Xiasong et al., "Reinforcement Learning for Hybrid and Plug-In Hybrid Electric Vehicle Energy Management: Recent Advances and Prospects", IEEE Industrial Electronics Magazine, IEEE, US, vol. 13, No. 3, Sep. 24, 2D19, pp. 16-25 (Year: 2019).

Office Action dated Jul. 20, 2021 in related U.S. Appl. No. 17/151,721.

* cited by examiner

Fig.9
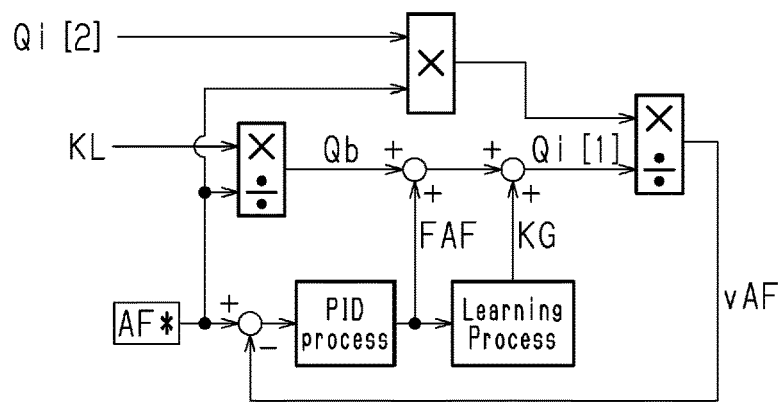
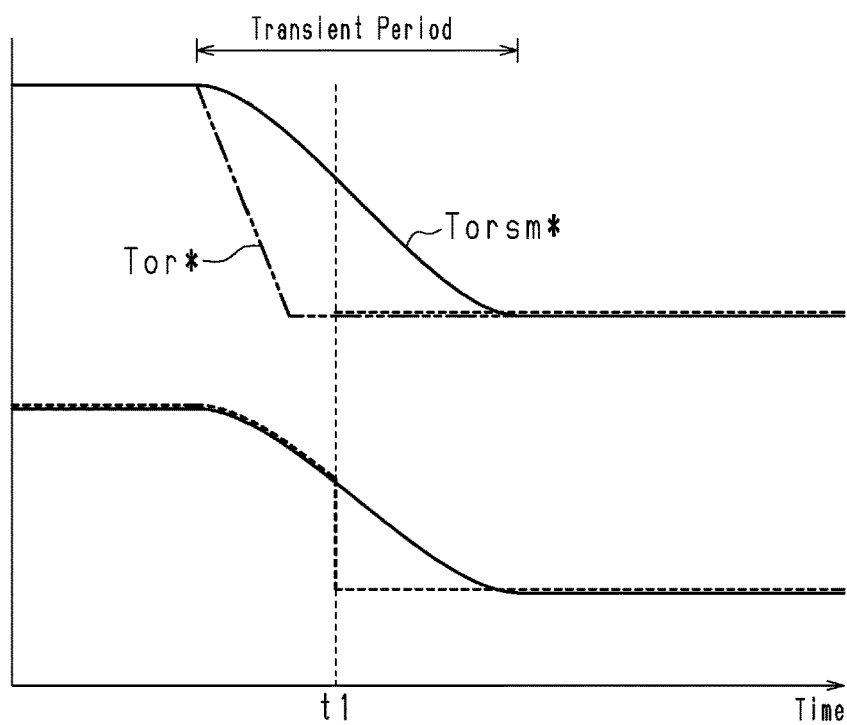
Fig.10A Torque
Fig.10B TA*

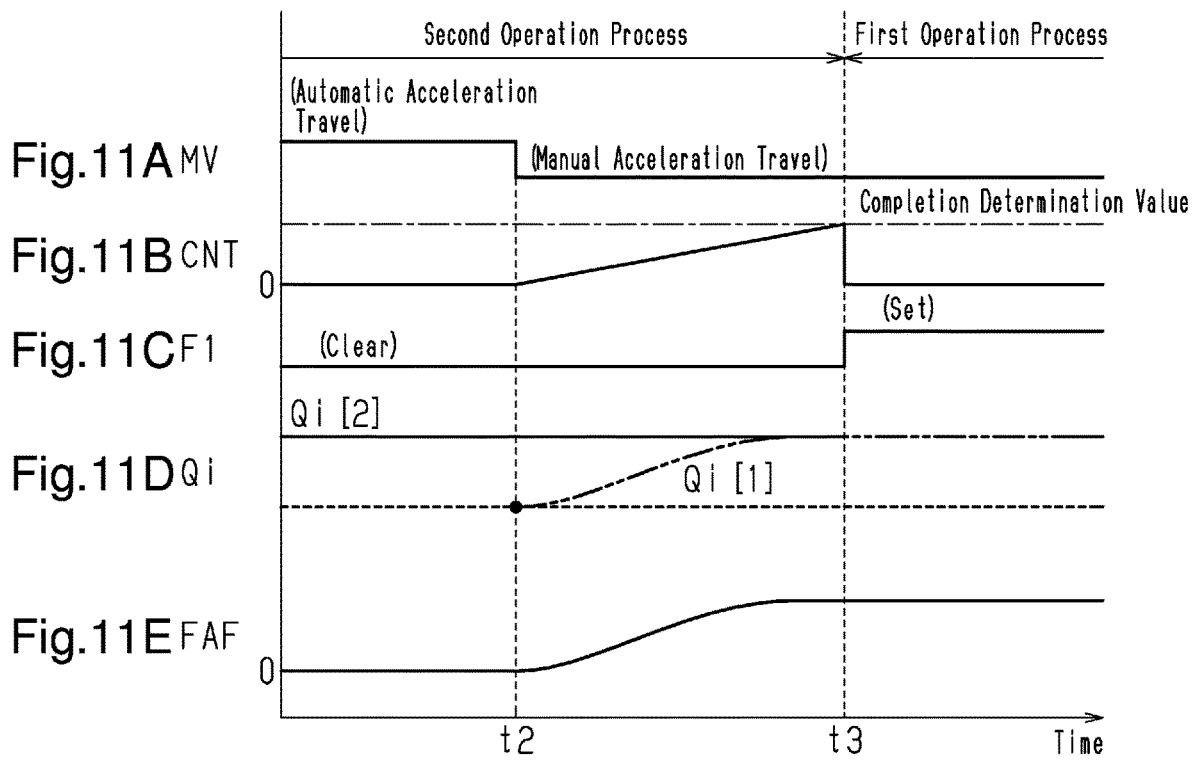
Fig. 12
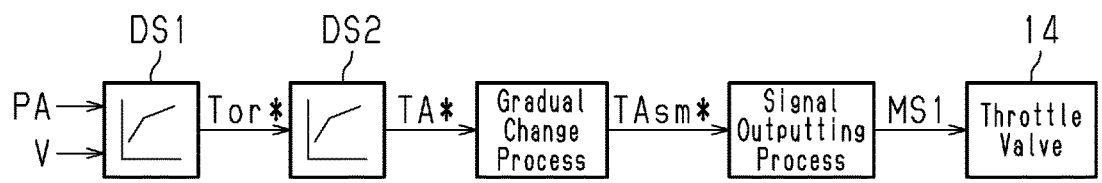

CONTROLLER AND CONTROL METHOD FOR INTERNAL COMBUSTION ENGINE

BACKGROUND

1. Field

The present disclosure relates to a controller and a control method for an internal combustion engine mounted on a vehicle.

2. Description of Related Art

Japanese Laid-Open Patent Publication No. 2016-006327 discloses a controller that operates a throttle valve, which is an operated unit of an internal combustion engine mounted on a vehicle, on the basis of a value obtained by subjecting an operated amount (e.g. depression amount) of an accelerator pedal to a process using a filter.

The above-described filter is required to set the operated amount of the throttle valve to a value that simultaneously satisfies demands for multiple factors such as the efficiency and exhaust characteristics of an internal combustion engine, and occupant comfort. Thus, adaptation of the filter requires a high number of man-hours of skilled workers. This also applies to adaptation of operated amounts of operated units of the engine other than the throttle valve.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a controller for an internal combustion engine mounted on a vehicle is provided. The controller is configured to change a controlled variable of the internal combustion engine by operating an operated unit of the internal combustion engine. The vehicle performs a manual acceleration travel, in which the vehicle is accelerated or decelerated in response to an operation of an accelerator pedal by a driver, and an automatic acceleration travel, in which the vehicle is automatically accelerated or decelerated regardless of the operation of the accelerator pedal. The controller includes a memory device and an execution device. The memory device is configured to store, in advance a relationship defining data set and an adapted data set. The relationship defining data set defines a relationship between a state of the vehicle, which includes a state of the internal combustion engine, and an operated amount of the operated unit. The relationship defining data set is updated during traveling of the vehicle. The adapted data set is used to calculate the operated amount based on the state of the vehicle. The adapted data set is not updated during traveling of the vehicle. The execution device is configured to perform an operation of the operated unit and execute: a first operation process that operates the operated unit by the operated amount, which is calculated on a basis of a state of the vehicle, using the adapted data set; a second operation process that operates the operated unit by the operated amount that is defined by the relationship defining data set and the state of the vehicle; a reward calculating process that calculates a reward on a basis of a detected value of the state of the vehicle when the operated unit is being operated by the second operation process; an updating process that updates the relationship defining data set so as to increase an expected return of the reward, on a basis of the state of the vehicle, the operated amount, and the reward when the operated unit is being operated by the second operation process; and a switching process that switches the operation of the operated unit between an operation by the first operation process and an operation by the second operation process, depending on whether the vehicle is performing the manual acceleration travel or the automatic acceleration travel.

In the above-described controller for an internal combustion engine, the first operation process executes calculation of the operated amount using the adapted data, which is stored in the memory device in advance. During operation of the operated unit of the internal combustion engine by the first operation process, the operated amount must be adapted before shipping of the vehicle. In contrast, during execution of the second operation process, the reward is calculated on the basis of the state of the vehicle, which changes as the result of operation of the operated unit by the second operation process. The relationship defining data set is updated such that the expected return of the reward is increased. That is, during the operation of the operated unit of the internal combustion engine by the second operation process, adaptation of the operated amount through the reinforcement learning is advanced. The operated amount when the operated unit is operated by the second operation process can be automatically adapted during traveling of the vehicle. This reduces the number of man-hours of skilled workers required to adapt the operated amount. However, the reinforcement learning must be performed under various conditions of the vehicle while taking relatively long amounts of time. Thus, depending on the operation of the vehicle, it takes a considerable amount of time to complete the adaptation. Therefore, depending on the operation of the vehicle, more desirable outcomes may be produced by completing the adaptation of the operated amount before the shipment of the vehicle than by adapting the operated amount through reinforcement learning during traveling of the vehicle. In the following description, the adaptation of the operated amount prior to shipment of the vehicle will be referred to as pre-shipping adaptation, and the adaptation of the operated amount through reinforcement learning during traveling of the vehicle will be referred to as on-site adaptation.

In the above-described vehicle, which performs the manual acceleration travel and the automatic acceleration travel, the operation of the vehicle can vary between the manual acceleration travel and the automatic acceleration travel. In such a vehicle, separate processes of adaptation of the operated amount may be required for each of the manual acceleration travel and the automatic acceleration travel. Further, in some cases, more desirable outcomes are produced for one of the manual acceleration travel and the automatic acceleration travel by the on-site adaptation than by the pre-shipping adaptation, while more desirable outcomes are produced for the other one of the manual acceleration travel and the automatic acceleration travel by the pre-shipping adaptation than by the on-site adaptation.

Accordingly, depending on whether the vehicle is performing the manual acceleration travel or the automatic acceleration travel, the above-described controller for an internal combustion engine switches the operation of the operated unit between the operation by the first operation process and the operation by the second operation process. Thus, even if the method of adaptation for producing desirable outcomes is different between the manual acceleration travel and the automatic acceleration travel, the adaptation of the operated amount is performed in a method suitable for each type of travel. Even in such a case, the number of man-hours of skilled workers is reduced as compared to a case in which the adaptation of the operated amount both in the manual acceleration travel and the automatic acceleration travel is performed in the pre-shipping adaptation. Therefore, the above-described controller for an internal combustion engine readily reduces the number of man-hours of skilled workers required to adapt the operated amount of the operated unit of the internal combustion engine.

In the above-described controller for an internal combustion engine, the adapted data set may include a data set that defines a map, the map using a state variable included in the state of the vehicle as an input, and outputting the operated amount. The first operation process may include a feedback correction process that calculates a feedback correction value in accordance with a deviation of a detected value of the controlled variable of the internal combustion engine from a target value, and calculating, as the operated amount, a value obtained by correcting, with the feedback correction value, an output value of the map, which uses a detected value of the state variable as an input. The feedback correction process corresponds to a correction process of the fuel injection amount in the air-fuel ratio feedback control, which corrects the fuel injection amount, for example, in accordance with the deviation of the detected value of the air-fuel ratio feedback control from the target value. It takes a certain amount of time for the feedback correction process to cause the controlled variable to converge to the target value. Thus, in a case in which the feedback correction process is started at the same time when the operation of the operated unit by the second operation process is switched to the operation of the operated unit by the first operation process, the controllability of the internal combustion engine may deteriorate until the controlled variable converges to the target value.

In this regard, when switching a process used to operate the operated unit from the second operation process to the first operation process, the execution device preferably starts a calculation of the operated amount by the feedback correction process at a point in time earlier than a point in time at which the operation of the operated unit by the second operation process is ended and an operation of the operated unit by the first operation process is started.

At switching between the above-described operation processes, the calculated value of the operated amount by the feedback correction process is not reflected on the actual operation of the operated unit during a period from when the feedback correction process is started until the operation of the operated unit by the first operation process is started. If the calculated value of the operated amount by the second operation process is a value that causes the controlled variable to become the target value, the value of the operated amount when the operated unit is operated using the calculated value of the operated amount in the feedback correction process can be obtained from the calculated values of the operated amounts of the feedback correction process and the second operation process. Thus, the feedback correction process during an operation of the operated unit by the second operation process is implemented by: obtaining a virtual controlled variable, which is the controlled variable when the operated unit is operated with a calculated value of the operated amount by the feedback correction process, on a basis of a calculated value of the operated amount by the feedback correction process and a calculated value of the operated amount by the second operation process; and calculating the feedback correction value using the virtual controlled variable in place of the detected value of the controlled variable.

In the above-described controller for an internal combustion engine, the adapted data set may include a data set that defines a map using a state variable included in the state of the vehicle as an input, and outputting the operated amount. The first operation process may include a gradual change process, which is one of a process that uses a detected value of the state variable as an input, and outputs, as an input value to the map, a value that changes after a delay in relation to the detected value, and a process that uses an output value of the map as an input, and outputs, as a calculated value of the operated amount, a value that changes after a delay in relation to the output value. The gradual change process is executed in order to prevent the controlled variable of the internal combustion engine from abruptly changing together with an abrupt change in the state variable. The gradual change process is executed, for example, at the calculation of the opening degree of the throttle. The gradual change process calculates the operated amount as a value that reflects changes in the state variable in the past.

In a case in which the gradual change process is started at the same time when the operation of the operated unit by the second operation process is switched to the operation of the operated unit by the first operation process, changes in the state variable prior to the switching ceases to be reflected on the calculated value of the operated amount of the first operation process. In this regard, when switching a process used to operate the operated unit from the second operation process to the first operation process, the execution device preferably starts a calculation of the operated amount through the gradual change process at a point in time earlier than a point in time at which the operation of the operated unit by the second operation process is ended and an operation of the operated unit by the first operation process is started. In this case, the calculation of the operated amount through the gradual change process in the first operation process is started earlier than the start of the operation of the operated unit using the calculated value. Thus, the operated amount at the start of the operation of the operated unit by the first operation process can be calculated as a value on which changes in the state variable prior to the start of the operation is reflected.

Another general aspect provides a control method that changes a controlled variable of an internal combustion engine mounted on a vehicle by operating an operated unit of the internal combustion engine. The vehicle performs a manual acceleration travel, in which the vehicle is accelerated or decelerated in response to an operation of an accelerator pedal by a driver, and an automatic acceleration travel, in which the vehicle is automatically accelerated or decelerated regardless of the operation of the accelerator pedal. The control method comprises: storing, in advance, a relationship defining data set that defines a relationship between a state of the vehicle, which includes a state of the internal combustion engine, and an operated amount of the operated unit, the relationship defining data set being updated during traveling of the vehicle, and an adapted data set that is used to calculate the operated amount based on the state of the vehicle, the adapted data set not being updated during traveling of the vehicle; and performing an operation of the operated unit, including: a first operation process that operates the operated unit by the operated amount, which is calculated on a basis of a state of the vehicle, using the adapted data set; a second operation process that operates the operated unit by the operated amount that is defined by the relationship defining data set and the state of the vehicle; a reward calculating process that calculates a reward on a basis of a detected value of the state of the vehicle when the operated unit is being operated by the second operation process; an updating process that updates the relationship defining data set so as to increase an expected return of the reward, on a basis of the state of the vehicle, the operated amount, and the reward when the operated unit is being operated by the second operation process; and a switching process that switches the operation of the operated unit between an operation by the first operation process and an operation by the second operation process, depending on whether the vehicle is performing the manual acceleration travel or the automatic acceleration travel.

Other features and aspects will be apparent from the following detailed description, the drawings, and the claims.

BRIEF DESCRIPTION OF THE DRAWINGS

FIG. 9 is a block diagram showing flows of processes related to calculation of an air-fuel ratio feedback correction value during operation of the operated unit by the second operation process in the controller.

FIG. 10A is a timing diagram showing changes in a requested torque Tor* and a requested torque gradual change value Torsm*.

FIG. 10B is a timing diagram showing changes in an opening degree command value TA*.

FIG. 11A is a timing diagram showing changes in a mode variable MV when a second operation process is switched to a first operation process in the controller.

FIG. 11B is a timing diagram showing changes in a counter CNT when the second operation process is switched to the first operation process in the controller.

FIG. 11C is a timing diagram showing changes in a flag F1 when the second operation process is switched to the first operation process in the controller.

FIG. 11D is a timing diagram showing changes in an injection amount command value Qi when the second operation process is switched to the first operation process in the controller.

FIG. 11E is a timing diagram showing changes in an air-fuel ratio feedback correction value FAF when the second operation process is switched to the first operation process in the controller.

FIG. 12 is a block diagram showing flows of processes in a modification of an operation process of a throttle valve.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 70 for an internal combustion engine 10 according to a first embodiment will now be described with reference to FIGS. 1 to 6.

Figure 1:
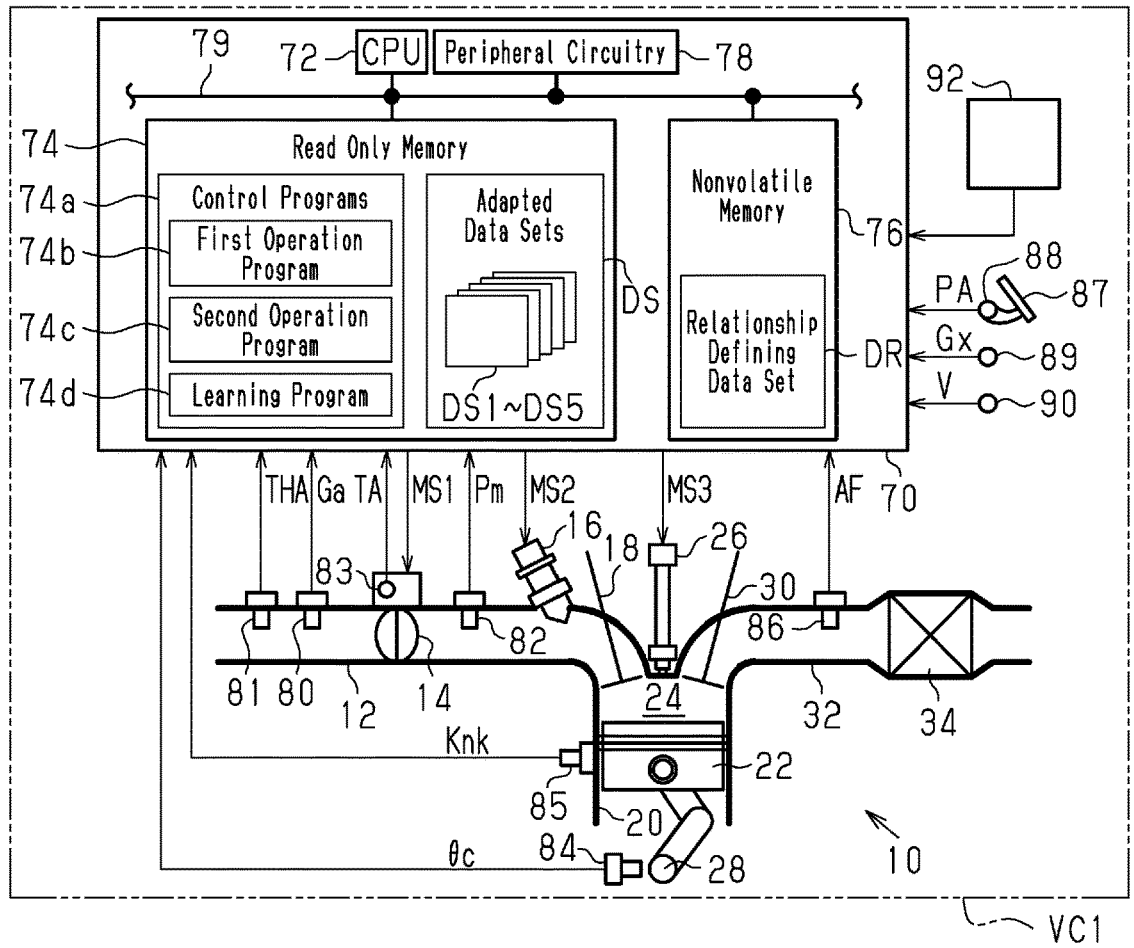
FIG. 1 is a schematic diagram showing a controller for an internal combustion engine according to a first embodiment.

FIG. 1 shows the configuration of the controller 70 of the present embodiment and the internal combustion engine 10 mounted on a vehicle VC1. The controller 70 controls the internal combustion engine 10. The internal combustion engine 10 includes an intake passage 12, in which a throttle valve 14 and a fuel injection valve 16 are arranged in that order from the upstream side. Air drawn into the intake passage 12 and fuel injected from the fuel injection valve 16 flow into a combustion chamber 24, which is defined by a cylinder 20 and a piston 22, when an intake valve 18 is opened. The air-fuel mixture is burned by spark discharge of an ignition device 26 in the combustion chamber 24, and the energy generated by the combustion is converted into rotational energy of a crankshaft 28 via the piston 22. The burned air-fuel mixture is discharged to an exhaust passage 32 as exhaust gas when an exhaust valve 30 is opened. The exhaust passage 32 incorporates a catalyst 34, which is an aftertreatment device for purifying exhaust gas.

The controller 70 operates operated units of the internal combustion engine 10 such as the throttle valve 14, the fuel injection valve 16, and the ignition device 26, thereby controlling parameters such as the torque and the ratios of exhaust components, which are controlled variables indicating the state of the internal combustion engine 10. FIG. 1 shows operation signals MS1 to MS3 respectively corresponding to the throttle valve 14, the fuel injection valve 16, and the ignition device 26.

The controller 70 obtains detected values of various sensors that detect the state of the internal combustion engine 10 in order to control the controlled variables of the internal combustion engine 10. The sensors that detect the state of the internal combustion engine 10 include an air flow meter 80, which detects an intake air amount Ga, an intake air temperature sensor 81, which detects an intake air temperature THA, an intake pressure sensor 82, which detects an intake pressure Pm, a throttle sensor 83, which detects a throttle opening degree TA of the throttle valve 14, and a crank angle sensor 84, which detects a rotational angle θc of a crankshaft 28. The sensors also include a knock sensor 85, which outputs a knock signal Knk indicating the occurrence of knocking in the combustion chamber 24, and an air-fuel ratio sensor 86, which detects an air-fuel ratio AF of the air-fuel mixture that has been burned in the combustion chamber 24. The controller 70 also refers to detected values of sensors that detect the state of the vehicle VC1, such as an accelerator pedal sensor 88, which detects an accelerator operated amount PA, or the amount of depression of an accelerator pedal 87, an acceleration sensor 89, which detects an acceleration Gx in the front-rear direction of the vehicle VC1, and a vehicle speed sensor 90, which detects a vehicle speed V.

Further, the vehicle VC1 includes an operation panel 92, which switches the traveling mode between a manual acceleration travel and an automatic acceleration travel and/or changes a target speed of the automatic acceleration travel. The manual acceleration travel is a traveling mode in which the vehicle VC1 is accelerated or decelerated in response to operation of the accelerator pedal 87 by the driver. The automatic acceleration travel is a traveling mode that is not based on the operation of the accelerator pedal 87. That is, in the automatic acceleration travel, the vehicle VC1 is automatically accelerated or decelerated so that the vehicle speed V is maintained at the target speed regardless of the operation of the accelerator pedal 87. When controlling the controlled variables of the internal combustion engine 10, the controller 70 refers to the value of a mode variable MV, which indicates which of the manual acceleration travel and the automatic acceleration travel is being selected as the traveling mode of the vehicle VC1.

Switching from the manual acceleration travel to the automatic acceleration travel is permitted when a target speed is set, and a starting operation for cruise control is performed on the operation panel 92 in a state where predetermined cruise control permitting conditions are satisfied. The cruise control permitting conditions include a condition where the vehicle VC1 is traveling on a limited-access road, and a condition where the vehicle speed V is in a predetermined range.

Switching from the automatic acceleration travel to the manual acceleration travel is executed when the driver presses the brake pedal and/or performs a cruise control canceling operation on the operation panel 92.

The controller 70 includes a CPU 72 and peripheral circuitry 78. The CPU 72 is an execution device that executes processes related to control of the internal combustion engine 10. The peripheral circuitry 78 includes a circuit that generates a clock signal regulating internal operations, a power supply circuit, and a reset circuit. The controller 70 includes, as memory devices, a read-only memory 74, in which stored data cannot be rewritten during traveling of the vehicle VC1, and a nonvolatile memory 76, in which stored data can be electrically rewritten during traveling of the vehicle VC1. The CPU 72, the read-only memory 74, the nonvolatile memory 76, and the peripheral circuitry 78 are allowed to communicate with one another through a local network 79.

The read-only memory 74 stores control programs 74a for controlling the internal combustion engine 10. The control programs 74a include two programs: a first operation program 74b and a second operation program 74c, which are used to operate operated units of the internal combustion engine 10. The read-only memory 74 stores multiple adapted data sets DS, which are used in operations of the operated units of the internal combustion engine 10 with the first operation program 74b. The nonvolatile memory 76 stores a relationship defining data set DR, which defines the relationship between the state of the vehicle VC1 and operated amounts. The relationship defining data set DR is used in operations of the operated units of the internal combustion engine 10 with the second operation program 74c. The read-only memory 74 stores a learning program 74d, which is a program for updating the relationship defining data set DR.

The adapted data sets DS include various types of mapping data used in calculation of the operated amounts of the operated units of the internal combustion engine 10. The mapping data includes combinations of discrete values of input variables and values of output variables each corresponding to a value of the input variables. The mapping data includes a mapping data set DS1 for calculating requested torque, a mapping data set DS2 for calculating an opening degree, a mapping data set DS3 for calculating basic injection timing, and a mapping data set DS4 for calculating retardation limit ignition timing. The mapping data set DS1 for calculating a requested torque uses the accelerator operated amount PA and the vehicle speed V as input variables, and outputs an output variable that is a requested torque Tor*, which is a requested value of the torque of the internal combustion engine 10. The mapping data set DS2 for calculating an opening degree uses the torque of the internal combustion engine 10 as an input variable, and outputs an output variable that is a value of the throttle opening degree TA required to generate the torque. The mapping data set DS3 for calculating basic injection timing uses an engine rotation speed NE and an intake air amount KL as input variables, and outputs an output variable that is a basic ignition timing Abse. The basic ignition timing Abse is the more retarded one of the optimum ignition timing, which is an ignition timing at which the torque of the internal combustion engine 10 is maximized, and a trace-knock ignition timing, which is the advancement limit of the ignition timing that can suppress knocking. The mapping data set DS4 for calculating retardation limit ignition timing uses the engine rotation speed NE and the intake air amount KL as input variables, and outputs an output variable that is retardation limit ignition timing Akmf. The retardation limit ignition timing Akmf is a retardation limit of the range of the ignition timing in which combustion of air-fuel mixture in the combustion chamber 24 does not deteriorate.

The adapted data sets DS include a model data set DS5 for calculating an intake air amount. The model data set DS5 is the data of a physical model of the behavior of the intake air of the internal combustion engine 10, which is used to calculate the intake air amount KL flowing into the combustion chamber 24. The model data set DS5 is configured to output the intake air amount KL in accordance with input parameters such as the intake air amount Ga, the intake air temperature THA, the intake pressure Pm, the throttle opening degree TA, and the engine rotation speed NE.

The mapping data sets DS1 to DS4 and the model data set DS5 are adapted in advance such that operated amounts that are calculated using these data sets satisfy requirements such as the exhaust characteristics of the internal combustion engine 10, the fuel consumption rate, and the driver comfort. The mapping data sets DS1 to DS4 and the model data set DS5 are written in the read-only memory 74 prior to shipping of the vehicle VC1, and can be updated only by using dedicated equipment installed in maintenance facility. That is, the adapted data sets DS are not updated during traveling of the vehicle VC1.

Figure 2:
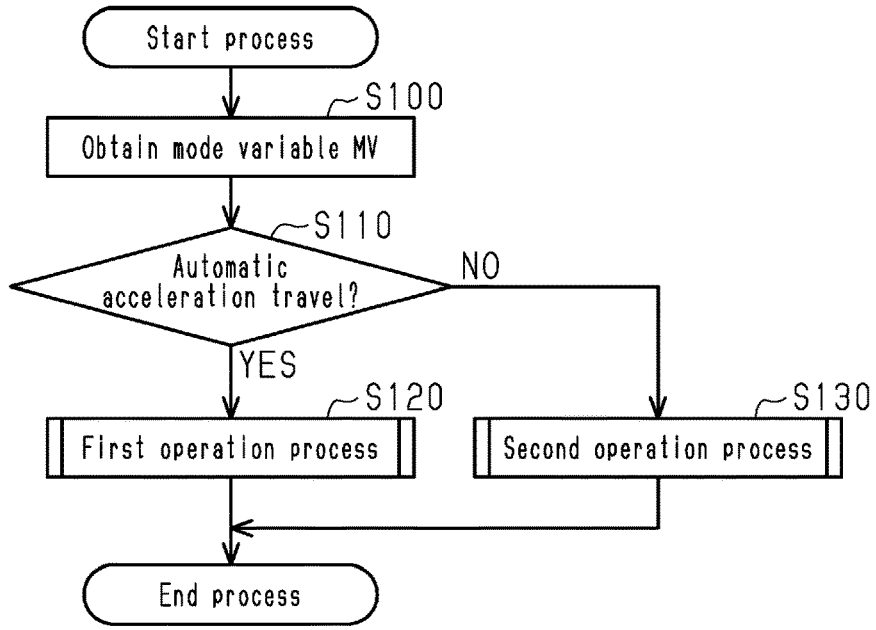
FIG. 2 is a flowchart showing a process executed by an execution device of the controller.

FIG. 2 shows the procedure of processes related to operations of operated units of the internal combustion engine 10 executed by the controller 70 according to the present embodiment. The processes shown in FIG. 2 are implemented by the CPU 72 repeatedly executing the control programs 74a stored in the read-only memory 74 at predetermined control cycles. In the following description, the number of each step is represented by the letter S followed by a numeral. In the present embodiment, depending on whether the vehicle VC1 is performing the manual acceleration travel or the automatic acceleration travel, switching process is executed by the process of FIG. 2 in order to switch between operations of the operated units by a first operation process or operations of the operated units by a second operation process.

When the series of processes shown in FIG. 2 is started, the CPU 72 first obtains the value of the mode variable MV in step S100. Subsequently, the CPU 72 determines whether the traveling mode of the vehicle VC1, which is indicated by the value of the mode variable MV, is the automatic acceleration travel in step S110. When the traveling mode of the vehicle VC1 is the automatic acceleration travel (S110: YES), the CPU 72 proceeds to step S120. In step S120, the CPU 72 executes the first operation process, which operates the operated units of the internal combustion engine 10 with the first operation program 74b. The CPU 72 then temporarily suspends the processes shown in FIG. 2. When the traveling mode of the vehicle VC1 is the manual acceleration travel (S110: NO), the CPU 72 proceeds to step S130. In step S130, the CPU 72 executes the second operation process, which operates the operated units of the internal combustion engine 10 with the second operation program 74c. The CPU 72 then temporarily suspends the processes shown in FIG. 2.

The operations of the operated units of the internal combustion engine 10 in the first operation process will now be described. In the first operation process, the operated units of the internal combustion engine 10 are operated on the basis of operated amounts that are calculated using the adapted data sets DS, which are stored in the read-only memory 74 in advance. The operations in the first operation process of some of the operated units of the internal combustion engine 10, namely, the throttle valve 14, the fuel injection valve 16, and the ignition device 26 will be described.

Figure 3:
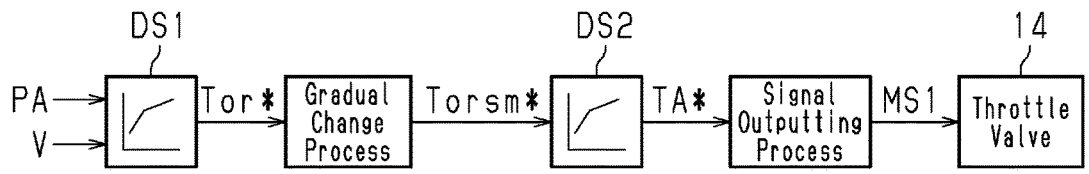
FIG. 3 is a block diagram showing flows of processes related to operation of a throttle valve in a first operation process executed by the controller.

FIG. 3 shows a procedure of processes of the CPU 72 related to the operation of the throttle valve 14 in the first operation process. When the throttle valve 14 is operated in the first operation process, the output of the mapping data set DS1, which uses the accelerator operated amount PA and the vehicle speed V as inputs, is calculated as the value of the requested torque Tor* as shown in FIG. 3. In the present embodiment, the first operation process is executed in the automatic acceleration travel. Thus, the actual operated amount of the accelerator pedal by the driver is not used as the accelerator operated amount PA. Instead, the first operation process uses a virtual accelerator operated amount PA that is obtained by converting a required amount of acceleration/deceleration of the vehicle VC1 necessary to maintain the vehicle speed V at a target speed into an operated amount of the accelerator pedal.

Subsequently, a value obtained by subjecting the requested torque Tor* to the gradual change process is calculated as a requested torque gradual change value Torsm*. The gradual change process is a filtering process that uses the requested torque Tor* as an input, and outputs a value that follows the requested torque Tor* with a delay as the requested torque gradual change value Torsm*. The present embodiment employs, as the gradual change process, a filtering process that outputs a moving average of the requested torque Tor* as the requested torque gradual change value Torsm*. When the throttle opening degree TA changes abruptly, the gradual change process suppresses impairment of the driver comfort due to an abrupt change in the engine rotation speed NE or deterioration of the exhaust characteristics due to a response delay of the air intake.

An output of the mapping data set DS2, which uses the requested torque gradual change value Torsm* as an input, is calculated as the value of an opening degree command value TA*, which is a command value of the throttle opening degree TA. A signal outputting process outputs a command signal MS1 to the throttle valve 14. The command signal MS1 instructs a change of the throttle opening degree TA to the opening degree command value TA*.

Figure 4:
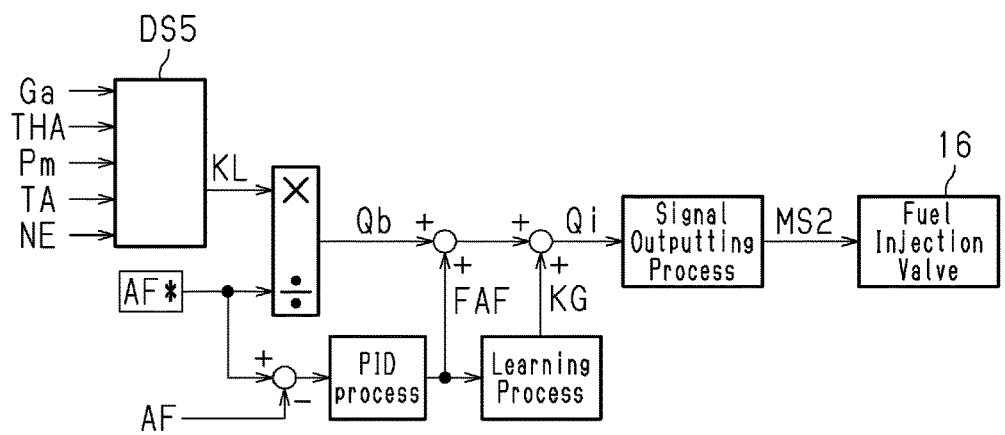
FIG. 4 is a block diagram showing flows of processes related to operation of a fuel injection valve in the first operation process executed by the controller.

FIG. 4 shows a procedure of processes of the CPU 72 related to the operation of the fuel injection valve 16 in the first operation process. When the fuel injection valve 16 is operated in the first operation process, the model data set DS5 uses, as inputs, parameters such as the intake air amount Ga, the intake air temperature THA, the intake pressure Pm, the throttle opening degree TA, and the engine rotation speed NE as shown in FIG. 4. The output of the model data set DS5 is calculated as the value of the intake air amount KL. The intake air amount KL is divided by a target air-fuel ratio AF*, which is a target value of the air-fuel ratio of the air-fuel mixture burned in the combustion chamber 24, and the quotient is calculated as the value of a basic injection amount Qb.

An air-fuel ratio feedback correction value FAF is calculated in accordance with the deviation of the air-fuel ratio AF from the target air-fuel ratio AF*. The calculation of the air-fuel ratio feedback correction value FAF is executed by a PID process. That is, a proportional term, an integral term, and a derivative term are calculated. The proportional term is a product obtained by multiplying the deviation of the detected value of the air-fuel ratio AF from the target air-fuel ratio AF* by a predetermined proportional gain. The integral term is a product obtained by multiplying the time integral of the deviation by a predetermined integral gain. The derivative term is a product obtained by multiplying the time derivative of the deviation by a predetermined derivative gain. The sum of the proportional term, the integral term, and the derivative term is calculated as the value of the air-fuel ratio feedback correction value FAF.

When the fuel injection valve 16 is operated by the first operation process, a learning process of an air-fuel ratio learning value KG is executed. The learning process of the air-fuel ratio learning value KG is executed on the basis of the value of the air-fuel ratio feedback correction value FAF in a steady operation of the internal combustion engine 10, in which the engine rotation speed NE and the intake air amount KL are stable. Specifically, the learning process of the air-fuel ratio learning value KG is executed by updating the value of the air-fuel ratio learning value KG in the manners described in the items (1) to (3) below. (1) When the absolute value of the air-fuel ratio feedback correction value FAF is less than a predetermined update determination value, the value of the air-fuel ratio learning value KG is maintained. (2) When the air-fuel ratio feedback correction value FAF is a positive value and the absolute value is greater than or equal to the predetermined update determination value, the value of the air-fuel ratio learning value KG is updated to a difference obtained by subtracting a predetermined update amount from the air-fuel ratio learning value KG before the update. (3) When the air-fuel ratio feedback correction value FAF is a negative value and the absolute value is greater than or equal to the predetermined update determination value, the value of the air-fuel ratio learning value KG is updated to a sum obtained by adding the predetermined update amount to the air-fuel ratio learning value KG before the update.

The sum of the basic injection amount Qb, the air-fuel ratio feedback correction value FAF, and the air-fuel ratio learning value KG is calculated as the value of an injection amount command value Qi. A signal outputting process outputs a command signal MS2 to the fuel injection valve 16. The command signal MS2 instructs fuel injection of an amount corresponding to the calculated value of the injection amount command value Qi.

Figure 5:
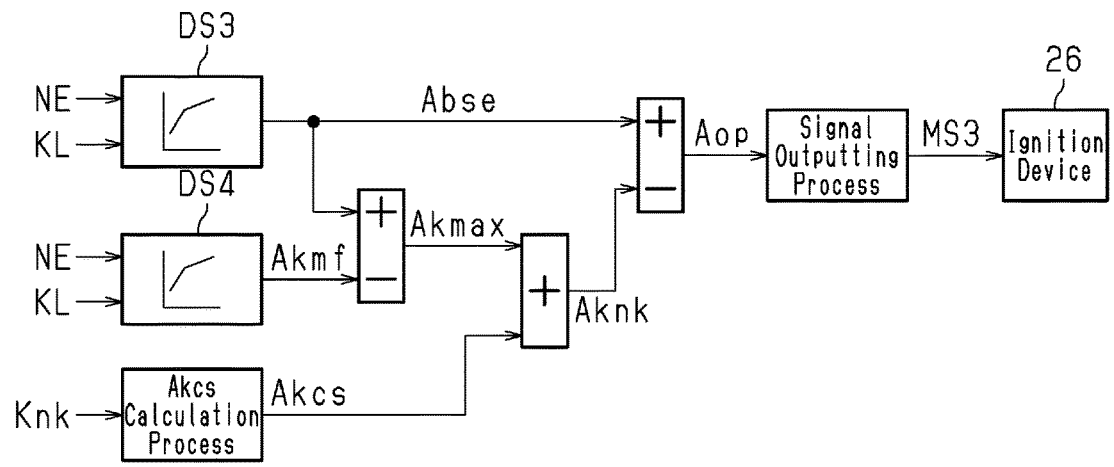
FIG. 5 is a block diagram showing flows of processes related to operation of an ignition device in the first operation process executed by the controller.

FIG. 5 shows a procedure of processes of the CPU 72 related to the operation of the ignition device 26 in the first operation process. When the ignition device 26 is operated in the first operation process, an output of the mapping data set DS3, which uses the engine rotation speed NE and the intake air amount KL as inputs, is calculated as the basic ignition timing Abse. An output of the mapping data set DS4, which uses the engine rotation speed NE and the intake air amount KL as inputs, is calculated as a value of the retardation limit ignition timing Akmf. Then, a difference obtained by subtracting the retardation limit ignition timing Akmf from the basic ignition timing Abse is calculated as a value of a maximum retardation amount Akmax.

When the ignition device 26 is operated in the first operation process, a calculation process of a knock control amount Akcs based on the knock signal Knk is executed. The calculation of the knock control amount Akcs is executed by updating the value of the knock control amount Akcs in the manners described in the following items (4) and (5). (4) When the knock signal Knk has a value that indicates the occurrence of knocking, the knock control amount Akcs is updated to a sum obtained by adding a predetermined knock retardation amount to the value prior to the update. (5) When the knock signal Knk has a value that indicates that knocking is not occurring, the knock control amount Akcs is updated to a difference obtained by subtracting a predetermined knock advancement amount from the value prior to the update. The knock retardation amount is set to a positive value, and the knock advancement amount is set to a value larger than the knock retardation amount.

Then, a sum obtained by adding the knock control amount Akcs to the maximum retardation amount Akmax is calculated as a value of an ignition timing retardation amount Aknk, and a difference obtained by subtracting the ignition timing retardation amount Aknk from the basic ignition timing Abse is calculated as a value of an ignition timing command value Aop. A signal outputting process outputs a command signal MS3 to the ignition device 26. The command signal MS3 instructs execution of ignition at timing that corresponds to the calculated value of the ignition timing command value Aop.

The operations of the operated units of the internal combustion engine 10 in the second operation process will now be described. In the second operation process, the operated units of the internal combustion engine 10 are operated in accordance with operated amounts that are determined by the relationship defining data set DR stored in the nonvolatile memory 76 and the state of the vehicle VC1.

The CPU 72 executes a reward calculating process and an updating process in parallel with the second operation process. The reward calculating process and the updating process are implemented by the CPU 72 executing the learning program 74d stored in the read-only memory 74.

In the present embodiment, the relationship defining data set DR is used to define an action value function Q and a policy π. The action value function Q is a table-type function representing values of an expected return in accordance with respective independent variables of a state s and an action a. In the present embodiment, the state s is determined on the basis of eight variables: the engine rotation speed NE, the intake air amount KL, the intake air amount Ga, the intake air temperature THA, the intake pressure Pm, the air-fuel ratio AF, the accelerator operated amount PA, and the vehicle speed V. Also, in the present embodiment, the action a is determined on the basis of three variables that are operated amounts of operated units of the internal combustion engine 10: the opening degree command value TA*, the injection amount command value Qi, and the ignition timing command value Aop. That is, the state s is an eight-dimensional vector, and the action a is a three-dimensional vector. The action value function Q(s, a) of the present embodiment is a table-type function.

Figure 6:
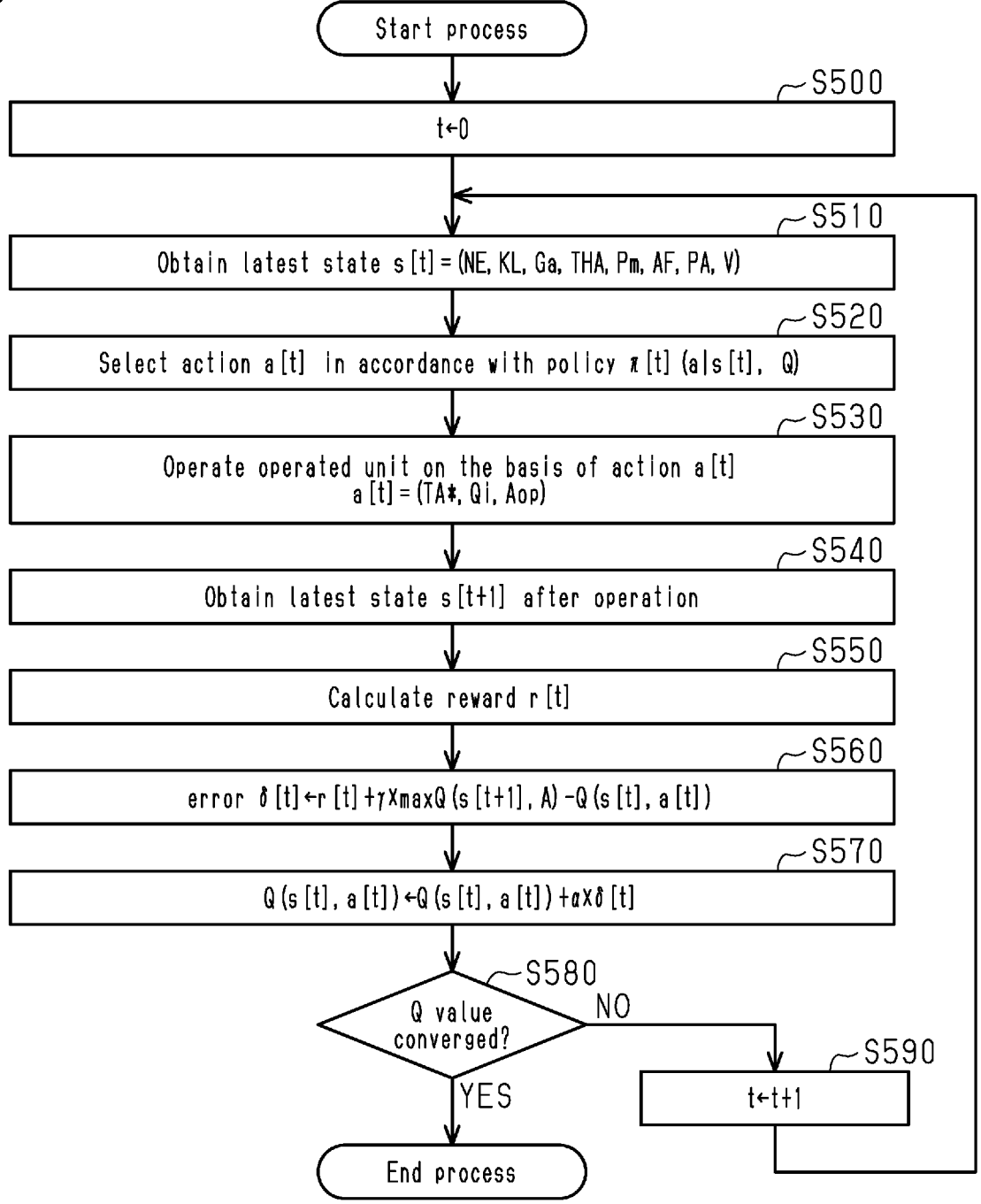
FIG. 6 is a flowchart showing steps of a second operation process, a reward calculating process, and a learning process executed by the controller.

FIG. 6 shows a procedure of processes of the CPU 72 related to the second operation process, the reward calculating process, and the updating process. The CPU 72 executes the series of processes shown in FIG. 6 at each execution of the second operation process in step S130 in FIG. 2. In the present embodiment, steps S510 to S530 in FIG. 6 correspond to the second operation process, steps S540 and S550 in FIG. 6 correspond to the reward calculating process, and steps S560 to S590 in FIG. 6 correspond the updating process.

When the series of processes of FIG. 6 is started, the value of t is reset to 0 in step S500. Subsequently, in step S510, the latest state s of the vehicle VC1 is acquired, and the values of the variables of the acquired state s are assigned to the variables of a state s[t]. Next, in step S520, an action a[t] is selected in accordance with a policy π[t], which is defined by the relationship defining data set DR. The action a[t] refers to an action a that is selected for the state s[t]. In the state s[t], the policy π[t] maximizes the probability of selecting an action a that maximizes the action value function Q(s[t], a), that is, a greedy action, without causing the selection probability of other actions a to become 0. Since there are cases where a greedy action is not selected, a search for an optimum action is possible. The policy π is implemented by an ε greedy action selection method and/or a Softmax action selection method. In the subsequent step S530, the operation signals MS1 to MS3 are respectively output to the throttle valve 14, the fuel injection valve 16, and the ignition device 26 in accordance with the opening degree command value TA*, the injection amount command value Qi, and the ignition timing command value Aop, which have been selected as the action a[t].

Thereafter, the reward calculating process is executed in steps S540 and S550. In the reward calculating process, the latest state s after operations of the operated units corresponding to the action a[t] is performed is acquired. The values of variables of the acquired states are assigned to the values of the variables of a state s[t+1] in step S540. In step S550, a reward r[t] by the action a[t] is calculated on the basis of the state s[t+1]. The reward r[t] is calculated as a sum of multiple rewards of different factors including: a reward related to the exhaust characteristics of the internal combustion engine 10 that is obtained, for example, from an integrated value of the deviation of the air-fuel ratio AF from the target air-fuel ratio AF*; a reward related to the fuel consumption rate of the internal combustion engine 10 that is obtained, for example, from an integrated value of the injection amount command value Qi; and a reward related to the driver comfort that is obtained, for example, from an integrated value of the acceleration Gx.

Subsequently, in step S560, an error δ[t] is calculated. The error δ[t] is used to calculate an update amount that updates the value of the action value function Q(s[t], a[t]) in a case of the state s[t] and the action a[t], among the values of the action value function Q. In the present embodiment, the error δ[t] is calculated using an off-policy temporal-difference (TD) method. That is, the maximum value of the action value function Q(s[t+1], A) is multiplied by a discount factor γ. The sum of the product and the reward r[t] is obtained. The action value function Q(s[t], a[t]) is subtracted from the sum, and the resultant is used as the error δ[t]. The symbol A represents a set of the actions a. Next, in step S570, the error δ[t] is multiplied by a learning rate a, and the product is added to the action value function Q(s[t], a[t]) in order to update the action value function Q(s[t], a[t]). That is, the values of the action value function Q(s, a), which is defined by the relationship defining data set DR, include a value in which the independent variables are the state s[t] and the action a[t], and that value is changed by α*δ[t]. Through the processes of steps S560 and S570, the relationship defining data set DR is updated so as to increase the expected return of the reward r[t]. This is because the action value function Q(s[t], a[t]) is updated to become a value that highly accurately represents the actual expected return.

In the subsequent step S580, it is determined whether the value of the action value function Q of each independent variable has converged. If it is determined that the value of the action value function Q has not converged (NO), the value of t is increased by 1 in step S590, and the process returns to step S510. If it is determined that the value of the action value function Q has converged (S580: YES), the series of processes shown in FIG. 6 is temporarily suspended.

An operation and advantages of the present embodiment will now be described.

The controller 70 of the present embodiment operates the operated units of the internal combustion engine 10 by selecting one of the first operation process or the second operation process. In the first operation process, the operated units are operated using the operated amounts that are calculated using the adapted data sets DS, which are stored in the read-only memory 74 in advance. The adapted data sets DS, which are used in calculation of the operated amounts in the first operation process, must be adapted before shipping of the vehicle VC1.

In the second operation process, the operated units are operated using operated amounts that are determined by the relationship defining data set DR stored in the nonvolatile memory 76 and the state of the vehicle VC1. During execution of the second operation process, the reward r is calculated on the basis of the state of the vehicle VC1, which changes as the result of operations of the operated units by the second operation process. Also, the relationship defining data set DR is updated such that the expected return of the reward r is increased. That is, during the operations of the operated units of the internal combustion engine 10 by the second operation process, adaptation of the operated amounts is advanced through the reinforcement learning. In this manner, the operated amounts are adapted through the reinforcement learning during traveling of the vehicle VC1. This reduces the number of man-hours of skilled workers required to adapt the operated amounts. However, the adaptation of the operated amounts through the reinforcement learning during traveling of the vehicle VC1 increases the calculation load on the controller 70. Thus, although adaptation of the operated amounts through the reinforcement learning during traveling of the vehicle VC1 is advantageous in reduction of the number of man-hours of skilled workers required to adapt the operated amounts, such a configuration is disadvantageous because it increases the calculation load on the controller 70. Also, it takes a certain amount of time for the operated amounts to be adapted through the reinforcement learning. This may reduce the controllability of the internal combustion engine 10 until the adaptation is completed.

The controller 70 of the present embodiment is used for the internal combustion engine 10 mounted on the vehicle VC1, which performs the manual acceleration travel and the automatic acceleration travel. In the manual acceleration travel, the vehicle VC1 is accelerated or decelerated in response to an operation of the accelerator pedal 87 by the driver. In the automatic acceleration travel, the vehicle VC1 is automatically accelerated or decelerated regardless of an operation of the accelerator pedal 87. The state of the vehicle VC1 varies between the manual acceleration travel and the automatic acceleration travel. Thus, the adaptation of the operated amounts must be performed separately. The automatic acceleration travel of the vehicle VC1 is performed only when the driver selects the automatic acceleration travel while traveling on a limited-access road. Accordingly, the automatic acceleration travel may be performed less frequently than the manual acceleration travel. Thus, if the adaptation of the operated amounts during the automatic acceleration travel is performed through the reinforcement learning, a state in which the adaptation is incomplete may have a long duration.

In the present embodiment, for the manual acceleration travel, which is expected to be performed relatively frequently, the operated amounts are adapted through the reinforcement learning during traveling of the vehicle VC1. On the other hand, for the automatic acceleration travel, which is expected to be performed less frequently, the operated amounts are adapted by a conventional method. In the present embodiment, although the operated amounts need to be adapted by a conventional method for the automatic acceleration travel, the number of man-hours of skilled workers required to perform the adaptation is reduced as compared to a case in which the adaptation of the operated amounts is performed by a conventional method for both of the manual acceleration travel and the automatic acceleration travel.

The present embodiment has the following advantages.

(1) In the above-described embodiment, adaptation of the operated amounts of the operated units of the internal combustion engine 10 for the manual acceleration travel, which is expected to be performed relatively frequently, is performed through reinforcement learning during traveling of the vehicle VC1. On the other hand, the automatic acceleration travel is expected to be performed less frequently, and the opportunities of the performance of reinforcement learning are thought to be limited during the automatic acceleration travel of the vehicle VC1. Accordingly, adaptation of the operated amounts of the operated units for the automatic acceleration travel is performed by a conventional method. Therefore, the adaptation of the operated amounts for each of the manual acceleration travel and the automatic acceleration travel is performed by a suitable method. Also, the number of man-hours of skilled workers is reduced.

(2) The adaptation of the operated amounts in the manual acceleration travel is performed through the reinforcement learning during traveling of the vehicle VC1. Thus, individual differences and/or changes over time of the internal combustion engine 10 are reflected on the results of the adaptation of the operated amounts of the operated units of the internal combustion engine 10 during the manual acceleration travel. This limits deterioration of the controllability of the internal combustion engine 10 due to such individual differences and/or changes over time.

Second Embodiment

Next, a controller for an internal combustion engine according to a second embodiment will now be described with reference to FIG. 7. In the present embodiment, like or the same reference numerals are given to those components that are like or the same as the corresponding components of the above-described embodiment, and the detailed description will be omitted.

The first embodiment deals with the vehicle VC1 in which the manual acceleration travel is expected to be performed more frequently than the automatic acceleration travel. The first embodiment performs the adaptation of the operated amounts of the operated units of the internal combustion engine 10 by a conventional method during the automatic acceleration travel, and performs the adaption through the reinforcement learning during traveling of the vehicle VC1, during the manual acceleration travel. In contrast, the vehicle VC1 equipped with an internal combustion engine 10 having a controller 70 according to a present embodiment is operated to perform the automatic acceleration travel more frequently than the manual acceleration travel.

Figure 7:
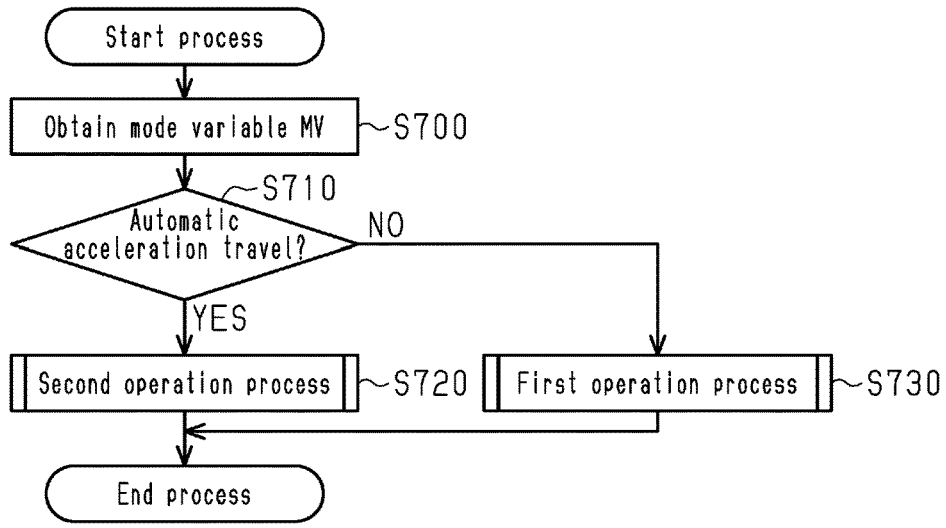
FIG. 7 is a flowchart showing steps executed by a controller for an internal combustion engine according to a second embodiment.

FIG. 7 shows the procedure of processes related to operations of operated units of the internal combustion engine 10 executed by the controller 70 according to the present embodiment. The processes shown in FIG. 7 are implemented by the CPU 72 repeatedly executing the control programs 74a stored in the read-only memory 74 at predetermined control cycles.

When the series of processes shown in FIG. 7 is started, the CPU 72 first obtains the value of the mode variable MV in step S700. Subsequently, the CPU 72 determines whether the traveling mode of the vehicle VC1, which is indicated by the value of the mode variable MV, is the automatic acceleration travel in step S710. When the traveling mode of the vehicle VC1 is the automatic acceleration travel (S710: YES), the CPU 72 proceeds to step S720. In step S720, the CPU 72 executes the second operation process, which operates the operated units of the internal combustion engine 10 with the second operation program 74c. The CPU 72 then temporarily suspends the processes shown in FIG. 7. When the traveling mode of the vehicle VC1 is the manual acceleration travel (S710: NO), the CPU 72 proceeds to step S730. In step S730, the CPU 72 executes the first operation process, which operates the operated units of the internal combustion engine 10 with the first operation program 74b. The CPU 72 then temporarily suspends the processes shown in FIG. 7.

Like the first embodiment, the present embodiment performs the operations of the throttle valve 14, the fuel injection valve 16, and the ignition device 26 when the first operation process is executed in step S730 of FIG. 7, in the manners shown in FIGS. 3, 4, and 5. However, in the present embodiment, since the first operation process is executed during the manual acceleration travel, the actual operated amount of the accelerator pedal by the driver is used as the accelerator operated amount PA used in the calculation of the requested torque Tor*. The process when the second operation process is executed in step S720 of FIG. 7 is executed in the manner shown in FIG. 6 as in the first embodiment. However, the present embodiment executes the second operation process during the automatic acceleration travel. Thus, the accelerator operated amount PA, which is one of the variables acquired as the latest states of the vehicle VC1 in step S510 of FIG. 6, is a virtual accelerator operated amount PA that is obtained by converting a required amount of acceleration/deceleration of the vehicle VC1 necessary to maintain the vehicle speed V at a target speed into an operated amount of the accelerator pedal.

In the present embodiment, in contrast to the case of the first embodiment, the adaptation of the operated amounts of the operated units of the internal combustion engine 10 is performed by a conventional method during the manual acceleration travel and is performed through the reinforcement learning during traveling of the vehicle VC1, during the automatic acceleration travel. In the case of the present embodiment, since the automatic acceleration travel is expected to be performed more frequently than the manual acceleration travel, the adaptation of the operated amounts in the above-described manner produces a desirable outcome.

Third Embodiment

Next, a controller for an internal combustion engine according to a third embodiment will now be described with reference to FIGS. 8 to 11E. In the present embodiment, like or the same reference numerals are given to those components that are like or the same as the corresponding components of the above-described embodiments, and the detailed description will be omitted. Like the second embodiment, the present embodiment operates the operated units of the internal combustion engine 10 by the second operation process during the automatic acceleration travel, and operates the operated units by the first operation process during the manual acceleration travel.

Figure 8:
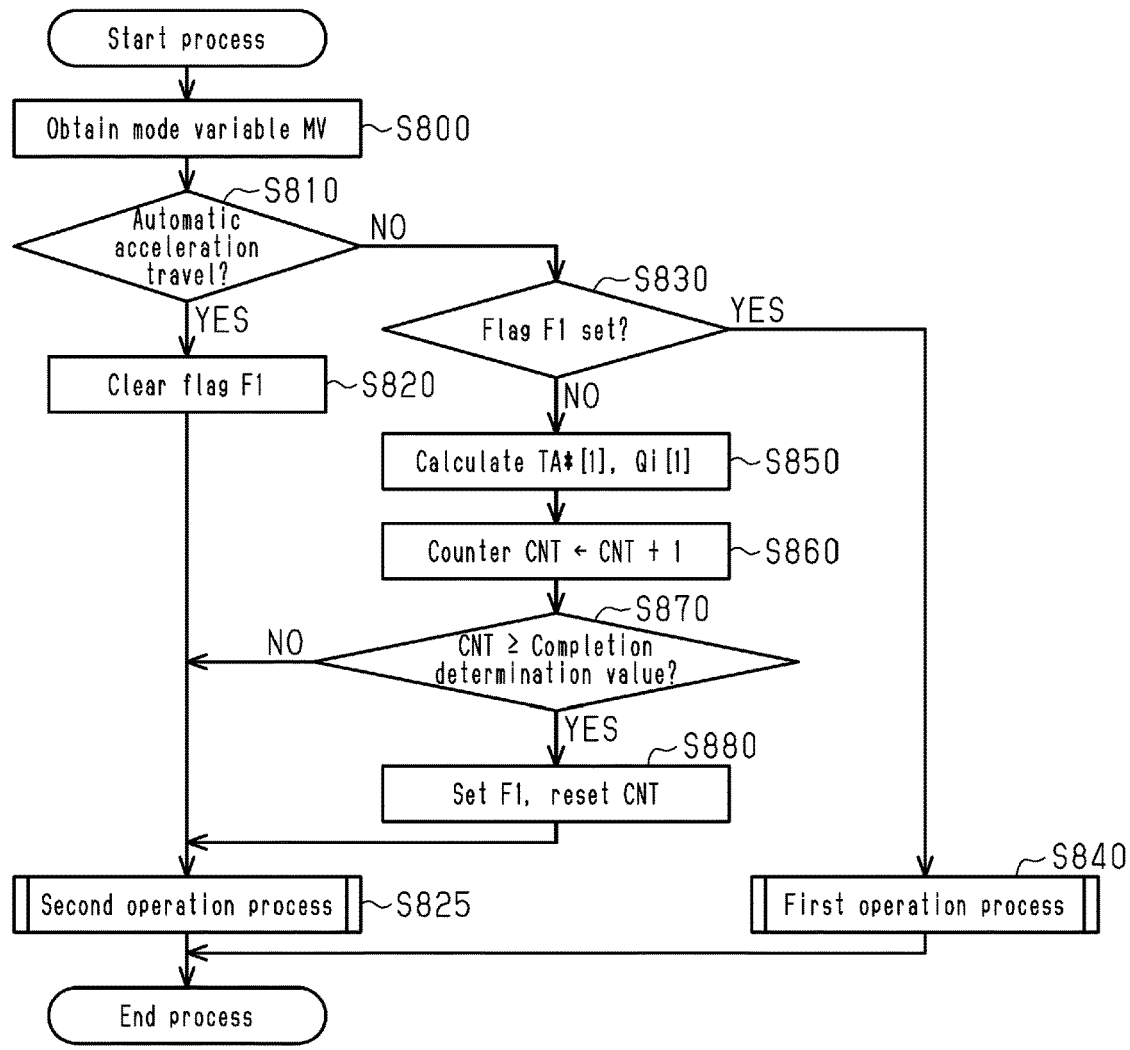
FIG. 8 is a flowchart showing steps executed by a controller for an internal combustion engine according to a third embodiment.

FIG. 8 shows the procedure of processes related to operations of operated units of the internal combustion engine 10 executed by the controller 70 according to the present embodiment. The processes shown in FIG. 7 are implemented by the CPU 72 repeatedly executing the control programs 74a stored in the read-only memory 74 at predetermined control cycles.

When the series of processes shown in FIG. 8 is started, the CPU 72 first obtains the value of the mode variable MV in step S800. Subsequently, the CPU 72 determines whether the traveling mode of the vehicle VC1, which is indicated by the value of the mode variable MV, is the automatic acceleration travel in step S810.

When the traveling mode of the vehicle VC1 is the automatic acceleration travel (S810: YES), the CPU 72 proceeds to step S820. In step S820, the CPU 72 clears a flag F1. In the subsequent step S825, the CPU 72 executes the second operation process that operates the operated units of the internal combustion engine 10 with the second operation program 74c. The CPU 72 then temporarily suspends the processes shown in FIG. 8. As discussed below, the CPU 72 sets the flag F1 when the start of the operation by the first operation process is permitted, and clears the flag F1 when the operation by the first operation process is ended and the operation by the second operation process is started.

When the traveling mode of the vehicle VC1, which is indicated by the value of the mode variable MV, is the manual acceleration travel (S810: NO), the CPU 72 determines whether the flag F1 is set in step S830. If the flag F1 is set (YES), the CPU 72 executes the first operation process in step S840 to operate the operated units of the internal combustion engine 10 with the first operation program 74b. The CPU 72 then temporarily suspends the processes shown in FIG. 8.

If the flag F1 has been cleared (S830: NO), the CPU 72 executes the calculation of the opening degree command value TA* and the injection amount command value Qi by the first operation process in step S850. The calculated values of the opening degree command value TA* and the injection amount command value Qi are not reflected on the actual operations of the throttle valve 14 and the fuel injection valve 16, but are stored in the nonvolatile memory 76. In the following description, the values of the opening degree command value TA* and the injection amount command value Qi that are calculated by the first operation process will be referred to as TA*[1] and Qi[1]. Also, the values of the opening degree command value TA* and the injection amount command value Qi that are calculated by the second operation process will be referred to as TA*[2] and Qi[2].

Subsequently, the CPU 72 increments in step S860 the value of a counter CNT, which indicates the time elapsed from when the value of the mode variable MV is switched from a value indicating the automatic acceleration travel to a value indicating the manual acceleration travel, and proceeds to step S870. In step S870, the CPU 72 determines whether the value of the counter CNT is greater than or equal to a predetermined completion determination value. When the value of the counter CNT is less than the completion determination value (S870: NO), the CPU 72 proceeds to step S825 and executes the second operation process. Thereafter, the CPU 72 temporarily suspends the processes shown in FIG. 8. When the value of the counter CNT is greater than or equal to the completion determination value (S870: YES), the CPU 72 sets the flag F1 and resets the value of the counter CNT to 0 in step S880. The CPU 72 then proceeds to step S825. After executing the second operation process in step S825, the CPU 72 temporarily suspends the processes shown in FIG. 8.

In the series of processes shown in FIG. 8, the flag F1 remains cleared during the automatic acceleration travel. The flag F1 is also in a cleared state immediately after the automatic acceleration travel is switched to the manual acceleration travel. Thus, although the calculation of the opening degree command value TA*[1] and the injection amount command value Qi[1] is executed by the first operation process immediately after the automatic acceleration travel is switched to the manual acceleration travel, the actual operations of the operated units of the internal combustion engine 10 are performed by the second operation process.

Thereafter, the calculation of the opening degree command value TA*[1] and the injection amount command value Qi[1] is executed by the first operation process each time the series of processes shown in FIG. 8 is executed at predetermined control cycles. The value of the counter CNT is incremented at each execution. When the value of the counter CNT reaches the completion determination value, the flag F1 is set, and the value of the counter CNT is reset. Thus, in the next control cycle, the operations of the operated units by the second operation process are ended, and the operations of the operated units by the first operation process are started.

As described above, the present embodiment basically executes the operations of the operated units of the internal combustion engine 10 by the first operation process during the manual acceleration travel. For a predetermined period of time after the automatic acceleration travel is switched to the manual acceleration travel, the operations of the operated units of the internal combustion engine 10 by the second operation process are continued. During the period in which the second operation process continues, the calculation of the opening degree command value TA*[1] and the injection amount command value Qi[1] by the first operation process is executed.

FIG. 9 shows a procedure of processes of the CPU 72 related to the calculation of the injection amount command value Qi[1] in step S850. At this time, as in the operation of the fuel injection valve 16 by the first operation process, the CPU 72 calculates a sum of the basic injection amount Qb, the air-fuel ratio feedback correction value FAF, and the air-fuel ratio learning value KG as the value of the injection amount command value Qi[1]. However, the actual operation of the fuel injection valve 16 is performed by the second operation process, and the calculation result of the injection amount command value Qi[1] is not reflected on the air-fuel ratio AF. Therefore, even on the basis of the air-fuel ratio AF, it is not possible to obtain the value of the air-fuel ratio feedback correction value FAF, which is required to cause the air-fuel ratio AF to become the target air-fuel ratio AF*.

In this regard, the operated amounts are adapted through the reinforcement learning during the execution of the second operation process. If the adaptation of the operated amounts through the reinforcement learning has progressed sufficiently, the calculated value of the injection amount command value Qi[2] by the second operation process is expected to have become a value that causes the air-fuel ratio AF to become the target air-fuel ratio AF*. Therefore, the value of the air-fuel ratio in a case in which the fuel injection valve 16 is operated with the injection amount command value Qi[1] calculated by the process shown in FIG. 9 is obtained in the following manner. First, the injection amount command value Qi[2] by the second operation process is multiplied by the target air-fuel ratio AF*. The product is divided by the injection amount command value Qi[1]. The quotient (AF*×Qi[2]/Qi[1]) is obtained as the value of the air-fuel ratio. In the series of processes shown in FIG. 9, the quotient is calculated as the value of a virtual air-fuel ratio vAF. The calculation of the air-fuel ratio feedback correction value FAF is executed in accordance with the deviation of the target air-fuel ratio AF* from the virtual air-fuel ratio vAF.

An operation and advantages of the present embodiment will now be described.

When the opening degree command value TA* of the throttle valve 14 is calculated by the first operation process as described above, the gradual change process is executed that uses the requested torque Tor* as an input, and outputs a value that follows the requested torque Tor* with a delay as the requested torque gradual change value Torsm*. An output of the mapping data set DS2, which uses the requested torque gradual change value Torsm* as an input, is calculated as the value of the opening degree command value TA*.

In FIG. 10A, the long-dash double-short-dash line represents an abrupt drop of the requested torque Tor*, and the solid line represents a corresponding change in the requested torque gradual change value Torsm*. In FIG. 10B, the solid line represents a corresponding change in the opening degree command value TA*[1] by the first operation process. The opening degree command value TA*[1] is calculated as a value that changes after a delay from a change in the requested torque Tor*. In the first operation process, the gradual change process limits deterioration of the exhaust characteristics of the internal combustion engine 10 due to a response delay of the intake air and a reduction in the driver comfort due to an abrupt change in the engine rotation speed NE.

In contrast, the second operation process uses the state s of the vehicle VC1 as an input to the relationship defining data set DR, and calculates the operated amounts of the operated units of the internal combustion engine 10 as outputs of the relationship defining data set DR. The adaptation of the operated amounts by the second operation process is performed through the reinforcement learning based on the reward r, which is calculated from a view point of the exhaust characteristics of the internal combustion engine 10 and/or the driver comfort. If the adaptation through the reinforcement learning is performed properly, the calculated value of the opening degree command value TA* [2] by the second operation process is calculated as a value that changes after a delay from a change in the requested torque Tor*, like the opening degree command value TA*[1] by the first operation process. In the following description, a transient period refers to a period during which the opening degree command value TA* is changing from a point in time at which the opening degree command value TA* starts changing in response to a change in the requested torque Tor* to a point in time at which the opening degree command value TA* converges to a value corresponding to the changed requested torque Tor*.

An exemplary case assumes that the operations of the operated units are switched from the second operation process to the first operation process at a point in time t1 during the transient period in FIG. 10, and the calculation of the opening degree command value TA*[1] by the first operation process is started at the same time as the switching of the operation processes. In FIG. 10, changes in the requested torque gradual change value Torsm* and the opening degree command value TA* in this case are respectively indicated by dotted lines. In this case, the calculated value of the opening degree command value TA*[2] by the second operation process is used to operate the throttle valve 14 before the point in time t1, and the calculated value of the opening degree command value TA*[1] by the first operation process is used to operate the throttle valve 14 after the point in time t1. In this case, since the gradual change process is also started at the point in time t1, changes in the requested torque Tor* before the point in time t1 are not reflected on the opening degree command value TA*[1]. Thus, the opening degree command value TA* changes in a stepwise manner at the switching from the second operation process to the first operation process, which causes the controllability of the internal combustion engine 10 to deteriorate.

In this regard, the present embodiment starts calculation of the opening degree command value TA*[1] by the first operation process prior to the start of the operations of the operated units of the internal combustion engine 10 by the first operation process. Thus, changes in the requested torque Tor* prior to the start of the operations of the operated units of the internal combustion engine 10 by the first operation process are reflected on the value of the opening degree command value TA*[1] at the start of the operations. This limits the change in the opening degree command value TA* due to the switching of the operation processes.

Further, in the present embodiment, prior to the switching of the operations of the operated units of the internal combustion engine 10 from the second operation process to the first operation process, the calculation of the injection amount command value Qi [1] is started simultaneously with the calculation of the opening degree command value TA*[1] by the first operation process.

FIGS. 11A to 11E represent a manner in which the controller 70 of the present embodiment operates the fuel injection valve 16 when switching the traveling mode of the vehicle VC1 from the automatic acceleration travel to the manual acceleration travel. FIG. 11A shows changes in the mode variable MV, FIG. 11B shows changes in the counter CNT, FIG. 11C shows changes in the flag F1, FIG. 11D shows changes in the injection amount command value Qi, and FIG. 11E shows changes in the air-fuel ratio feedback correction value FAF.

In the example of FIGS. 11A to 11E, the traveling mode of the vehicle VC1 is switched from the automatic acceleration travel to the manual acceleration travel at a point in time t2. As described above, in the present embodiment, the operated units of the internal combustion engine 10 are basically operated by the second operation process during the automatic acceleration travel and by the first operation process during the manual acceleration travel. However, at the point in time t2, the second operation process is being continued, and the fuel injection valve 16 keeps being operated in accordance with the injection amount command value Qi[2] by the second operation process. In a state in which the adaptation of the operated amounts of the second operation process through the reinforcement learning is performed properly, a value that causes the air-fuel ratio AF to become the target air-fuel ratio AF* is calculated as the injection amount command value Qi[2].

In this regard, at the point in time t2, the calculation of the injection amount command value Qi[1] by the first operation process is started. As described above, at the calculation of the injection amount command value Qi[1] in the first operation process, a feedback correction process using the air-fuel ratio feedback correction value FAF is executed. The air-fuel ratio feedback correction value FAF is calculated in accordance with the deviation of the air-fuel ratio AF from the target air-fuel ratio AF*. The air-fuel ratio feedback correction value FAF is 0 immediately after the calculation of the injection amount command value Qi[1] is started, so that injection amount command value Qi[1] may be significantly different from the value that causes the air-fuel ratio AF to become the target air-fuel ratio AF*. In the case of FIGS. 11A to 11E, the injection amount command value Qi[1] at the point in time t2 is smaller than the injection amount command value Qi[2]. If the value that causes the air-fuel ratio AF to become the target air-fuel ratio AF* has been calculated as the injection amount command value Qi[2], the injection amount command value Qi[1] has become a value that causes the air-fuel ratio AF to become leaner than the target air-fuel ratio AF*. Thus, in a case in which the operations of the operated units of the internal combustion engine 10 by the first operation process are started at the point in time t2, the air-fuel ratio AF temporarily becomes leaner than the target air-fuel ratio AF*, causing the exhaust characteristics of the internal combustion engine 10 to deteriorate.

At this time, on the basis of the injection amount command values Qi[1], Qi[2] of the operation processes, a predicted value of the air-fuel ratio AF in a case in which the fuel injection valve 16 is operated in accordance with the injection amount command value Qi[1] is calculated as the virtual air-fuel ratio vAF, and the calculation of the air-fuel ratio feedback correction value FAF is executed using the virtual air-fuel ratio vAF. The adaptation of the injection amount command value Qi[2] of the second operation process and the calculation of the virtual air-fuel ratio vAF are executed properly, the injection amount command value Qi[1] after the point in time t2 approaches the value that causes the air-fuel ratio AF to become the target air-fuel ratio AF*. That is, the injection amount command value Qi[1] approaches the injection amount command value Qi[2] after the point in time t2.

At the point in time t2, the counter CNT starts being incremented. Then, the flag F1 is set at a point in time t3, at which the value of the counter CNT reaches the completion determination value. In the present embodiment, the process that operates the operated units of the internal combustion engine 10 are switched from the second operation process to the first operation process in response to the setting of the flag F1. At this point in time, the calculated value of the injection amount command value Qi[1] by the first operation process has converged to the same value as the injection amount command value Qi[2], that is, the value that causes the air-fuel ratio AF to become the target air-fuel ratio AF*. This prevents the air-fuel ratio AF from being significantly different from the target air-fuel ratio AF* immediately after the start of the operation of the fuel injection valve 16 by the first operation process.

The above-described embodiments may be modified as follows. The above-described embodiments and the following modifications can be combined as long as the combined modifications remain technically consistent with each other.

Regarding Automatic Acceleration Travel and Manual Acceleration Travel

In the above-described embodiments, the automatic acceleration travel is a traveling mode that automatically accelerates or decelerates the vehicle VC1 so as to maintain the vehicle speed V at the target speed. The present disclosure is not limited to this. The automatic acceleration travel may be a traveling mode that automatically accelerates or decelerates the vehicle VC1 on the basis of detection results of the road on which the vehicle VC1 is traveling, and vehicles and pedestrians around the vehicle VC1 Also, in the automatic acceleration travel, at least one of steering and braking of the vehicle VC1 may be performed automatically in addition to acceleration and deceleration of the vehicle VC1. Further, in the manual acceleration travel, at least one of steering and braking of the vehicle VC1 may be performed automatically, while acceleration or deceleration of the vehicle VC1 is performed in response to the operation of the accelerator pedal by the driver.

Regarding Operated Units of Internal Combustion Engine

The operated units of the internal combustion engine 10 subject to switching between the first operation process and the second operation process may include operated units other than the throttle valve 14, the fuel injection valve 16, and the ignition device 26. For example, the present disclosure may be employed in an internal combustion engine that is provided with an exhaust gas recirculation mechanism, which recirculates some of the exhaust gas to intake air, and an EGR valve, which is located in the exhaust gas recirculation mechanism and regulates the recirculated amount of the exhaust gas. In this case, the EGR valve may be an operated unit of the internal combustion engine subject to switching between the first operation process and the second operation process. Also, the present disclosure may be employed in an internal combustion engine that is provided with a variable valve actuation mechanism, which varies actuation of the intake valve 18 and/or the exhaust valve 30. In this case, the variable valve actuation mechanism may be an operated unit of the internal combustion engine subject to switching between the first operation process and the second operation process.

Regarding Switching Process

The operated units that are subject to the switching between the first operation process and the second operation process by the switching process may be limited to some of the operated units of the internal combustion engine, and the remaining operated units may be controlled by the first operation process or the second operation process either in the manual acceleration travel or the automatic acceleration travel.

Regarding State s

In the above-described embodiments, the state s includes eight parameters: the engine rotation speed NE, the intake air amount KL, the intake air amount Ga, intake air temperature THA, the intake pressure Pm, the air-fuel ratio AF, the accelerator operated amount PA, and the vehicle speed V. However, the present disclosure is not limited to this. One or more of the parameters may be removed from the state s. Alternatively, the state s may include additional parameters that indicate the state of the internal combustion engine 10 or the vehicle VC1.

Regarding Reward r

The calculation of the reward r based on the state s may be executed in a manner different from those in the above-described embodiments. For example, amounts of emission of hazardous constituents in the exhaust, such as nitrogen oxide and fine particulate matter may be obtained, and a reward related to the exhaust characteristics of the internal combustion engine 10 may be calculated on the basis of the amounts of emission. Alternatively, the levels of vibrations and noises in the passenger compartment may be measured, and a reward related to the comfort may be calculated on the basis of the measurement results.

Regarding Action Value Function Q

In the above-described embodiments, the action value function Q is a table-type function. However, the present disclosure is not limited to this. For example, a function approximator may be used as the action value function Q. Also, instead of using the action value function Q, the policy π may be expressed by a function approximator that uses the state s and the action a as independent variables, and uses, as a dependent variable, the probability that the action a will be taken. The policy π may also be updated in accordance with the reward r.

Regarding Updating Process

In the above-described embodiments, the relationship defining data set DR is updated by the off-policy TD method. However, the present disclosure is not limited to this. For example, the update may be performed by an on-policy TD method such as a state-action-reward-state-action (SARSA) method. Also, an eligibility trace method may be used as an on-policy update method. Alternatively, the relationship defining data set DR can be updated by a method different from the ones described above, such as a Monte Carlo method.

Regarding Feedback Correction Process

The calculation of the injection amount command value Qi[1] of the fuel injection valve 16 in the first operation process according to the above-described embodiments is executed through the feedback correction process in accordance with the air-fuel ratio AF. In the third embodiment, at the switching of an operation from the second operation process to the first operation process, the calculation of the injection amount command value Qi[1] by the feedback correction process is started prior to the end of the operation by the second operation process and the start of the operation of the first operation process. When the operated amounts calculated in the first operation process include an operated amount calculated by a similar feedback correction process, the calculation of the operated amount by the feedback correction process may be started prior to the start of the operation by the first operation process, as in the case of the injection amount command value Qi[1].

The feedback correction process refers to the following process. The calculation of the operated amounts in the feedback correction process is executed using adapted data that is stored in the memory device in advance, uses a state variable indicating the state of the vehicle as an input, and defines a map that outputs the operated amounts. In the feedback correction process, a feedback correction value is calculated in accordance with the deviation of the detected value of a controlled variable of the internal combustion engine. The output value of the map, which uses the detected value of the state variable, is corrected using the feedback correction process. The corrected value is calculated as the operated amount. In this feedback correction process, the feedback correction of the operated amount is performed in order to cause the controlled variable of the internal combustion engine to become the target value. It takes a certain amount of time for the feedback correction to cause the controlled variable to converge to the target value. Thus, in a case in which the feedback correction process is started at the same time when the operation of the operated unit by the second operation process is switched to the operation of the operated unit by the first operation process, the controllability of the internal combustion engine may deteriorate until the controlled variable converges to the target value. Deterioration of the controllability of the internal combustion engine immediately after the switching of operation from the second operation process to the first operation process is suppressed by the start of the calculation of the operated amount by the feedback correction process prior to the switching.

Regarding Gradual Change Process

The calculation of the opening degree command value TA*[1] of the throttle valve 14 in the first operation process in the above-described embodiments is executed through the gradual change process. In the third embodiment, at the switching of an operation from the second operation process to the first operation process, the calculation of the opening degree command value TA*[1] by the gradual change process is started prior to the end of the operation by the second operation process and the start of the operation of the first operation process. When the operated amounts calculated in the first operation process include an operated amount calculated by a similar gradual change process, the calculation of the operated amount by the gradual change process may be started prior to the start of the operation by the first operation process, as in the case of the opening degree command value TA*[1].

The gradual change process refers to the following process. The calculation of the operated amounts in the gradual change process is also executed using adapted data that is stored in the memory device in advance, uses a state variable indicating the state of the vehicle as an input, and defines a map that outputs the operated amounts. The gradual change process is one of two different processes A and B. The process A uses a detected value of a state variable as an input, and outputs, as an input value to the map, a value that changes after a delay in relation to the detected value. The process B uses the output value of the map as an input, and outputs, as a calculated value of the operated amount, a value that changes after a delay in relation to the output value. When the opening degree command value TA*[1] of the throttle valve 14 is calculated in the above-described embodiments, the process A is executed as the gradual change process. However, the process B can be executed as the gradual change process.

FIG. 12 shows a procedure of processes of the CPU 72 related to the operation of the throttle valve 14 in the first operation process in a case in which the process B is executed as the gradual change process in order to calculate the opening degree command value TA*. When the throttle valve 14 is operated in the first operation process in this case, the output of the mapping data set DS1, which uses the accelerator operated amount PA and the vehicle speed V as inputs, is calculated as the value of the requested torque Tor* as shown in FIG. 12. An output of the mapping data set DS2, which uses the requested torque Tor* as an input, is calculated as the value of the opening degree command value TA*. Further, the value obtained by subjecting the opening degree command value TA* to the gradual change process is calculated as an opening degree gradual change command value TAsm*. A signal outputting process outputs a command signal MS1 to the throttle valve 14. The command signal MS1 instructs a change of the throttle opening degree TA to the opening degree gradual change command value TAsm*.

The controller 70 may be processing circuitry including: 1) one or more processors that operate according to a computer program (software); 2) one or more dedicated hardware circuits (application specific integrated circuits: ASIC) that execute at least part of various processes, or 3) a combination thereof. The processor includes a CPU and memories such as a RAM and a ROM. The memories store program codes or commands configured to cause the CPU to execute processes. The memory, or computer readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine mounted on a vehicle, the controller being configured to change a controlled variable of the internal combustion engine by operating an operated unit of the internal combustion engine, wherein the vehicle performs a manual acceleration travel, in which the vehicle is accelerated or decelerated in response to an operation of an accelerator pedal by a driver, and an automatic acceleration travel, in which the vehicle is automatically accelerated or decelerated regardless of the operation of the accelerator pedal, and the controller comprises:

a memory device, which is configured to store, in advance a relationship defining data set that defines a relationship between a state of the vehicle, which includes a state of the internal combustion engine, and an operated amount of the operated unit, the relationship defining data set being updated during traveling of the vehicle, and an adapted data set that is used to calculate the operated amount based on the state of the vehicle, the adapted data set not being updated during traveling of the vehicle; and an execution device configured to perform an operation of the operated unit and execute:

a first operation process that operates the operated unit by the operated amount, which is calculated on a basis of a state of the vehicle, using the adapted data set;

a second operation process that operates the operated unit by the operated amount that is defined by the relationship defining data set and the state of the vehicle;

a reward calculating process that calculates a reward on a basis of a detected value of the state of the vehicle when the operated unit is being operated by the second operation process;

an updating process that updates the relationship defining data set so as to increase an expected return of the reward, on a basis of the state of the vehicle, the operated amount, and the reward when the operated unit is being operated by the second operation process; and a switching process that switches the operation of the operated unit between an operation by the first operation process and an operation by the second operation process, depending on whether the vehicle is performing the manual acceleration travel or the automatic acceleration travel.

2. The controller for an internal combustion engine according to claim 1, wherein the adapted data set includes a data set that defines a map, the map using a state variable included in the state of the vehicle as an input, and outputting the operated amount, the first operation process includes a feedback correction process that calculates a feedback correction value in accordance with a deviation of a detected value of the controlled variable of the internal combustion engine from a target value, and calculating, as the operated amount, a value obtained by correcting, with the feedback correction value, an output value of the map, which uses a detected value of the state variable as an input, and the execution device is configured to, when switching a process used to operate the operated unit from the second operation process to the first operation process, start a calculation of the operated amount by the feedback correction process at a point in time earlier than a point in time at which the operation of the operated unit by the second operation process is ended and an operation of the operated unit by the first operation process is started.

3. The controller for an internal combustion engine according to claim 2, wherein the feedback correction process during an operation of the operated unit by the second operation process, includes obtaining a virtual controlled variable, which is the controlled variable when the operated unit is operated with a calculated value of the operated amount by the feedback correction process, on a basis of a calculated value of the operated amount by the feedback correction process and a calculated value of the operated amount by the second operation process, and calculating the feedback correction value using the virtual controlled variable in place of the detected value of the controlled variable.

4. The controller for an internal combustion engine according to claim 1, wherein the adapted data set includes a data set that defines a map, the map using a state variable included in the state of the vehicle as an input, and outputting the operated amount, the first operation process includes a gradual change process, which is one of a process that uses a detected value of the state variable as an input, and outputs, as an input value to the map, a value that changes after a delay in relation to the detected value, and a process that uses an output value of the map as an input, and outputs, as a calculated value of the operated amount, a value that changes after a delay in relation to the output value, and the execution device is configured to, when switching a process used to operate the operated unit from the second operation process to the first operation process, start a calculation of the operated amount through the gradual change process at a point in time earlier than a point in time at which the operation of the operated unit by the second operation process is ended and an operation of the operated unit by the first operation process is started.

5. The controller according to an internal combustion engine according to claim 4, wherein the gradual change process is executed when an opening degree of a throttle valve is calculated.

6. A control method that changes a controlled variable of an internal combustion engine mounted on a vehicle by operating an operated unit of the internal combustion engine, wherein the vehicle performs a manual acceleration travel, in which the vehicle is accelerated or decelerated in response to an operation of an accelerator pedal by a driver, and an automatic acceleration travel, in which the vehicle is automatically accelerated or decelerated regardless of the operation of the accelerator pedal, and the control method comprises:

storing, in advance a relationship defining data set that defines a relationship between a state of the vehicle, which includes a state of the internal combustion engine, and an operated amount of the operated unit, the relationship defining data set being updated during traveling of the vehicle, and an adapted data set that is used to calculate the operated amount based on the state of the vehicle, the adapted data set not being updated during traveling of the vehicle; and performing an operation of the operated unit, including:

a first operation process that operates the operated unit by the operated amount, which is calculated on a basis of a state of the vehicle, using the adapted data set;

a second operation process that operates the operated unit by the operated amount that is defined by the relationship defining data set and the state of the vehicle;

a reward calculating process that calculates a reward on a basis of a detected value of the state of the vehicle when the operated unit is being operated by the second operation process;

an updating process that updates the relationship defining data set so as to increase an expected return of the reward, on a basis of the state of the vehicle, the operated amount, and the reward when the operated unit is being operated by the second operation process; and a switching process that switches the operation of the operated unit between an operation by the first operation process and an operation by the second operation process, depending on whether the vehicle is performing the manual acceleration travel or the automatic acceleration travel.

* * * * *